United States Patent [19]

Pankratz

[11] Patent Number: 4,882,379

[45] Date of Patent: Nov. 21, 1989

[54] ADHERABLE POLYESTER FILM

[75] Inventor: Richard P. Pankratz, Circleville, Ohio

[73] Assignee: E.I. Du Pont De Nemours and Company, Wilmington, Del.

[21] Appl. No.: 206,432

[22] Filed: Jun. 14, 1988

[51] Int. Cl.$^4$ ............................................. C08G 18/83
[52] U.S. Cl. ..................................... 524/590; 524/751; 524/802; 524/840; 524/871; 524/874; 525/454
[58] Field of Search ................ 525/454; 524/751, 874, 524/871, 590, 802, 840; 428/423.7

[56] References Cited

U.S. PATENT DOCUMENTS

| | | | |
|---|---|---|---|
| 3,419,510 | 12/1968 | Hudak | 524/109 |
| 3,917,570 | 11/1975 | Chang et al. | 260/849 |
| 3,962,369 | 6/1976 | Chang et al. | 428/268 |
| 3,994,849 | 11/1976 | Dunlop | 524/601 |
| 4,012,349 | 3/1977 | Matsuda et al. | 525/454 |
| 4,016,122 | 4/1977 | Matsuda et al. | 525/454 |
| 4,018,849 | 4/1977 | Chang et al. | 260/849 |
| 4,310,565 | 1/1982 | Lehner et al. | 427/130 |

FOREIGN PATENT DOCUMENTS

| | | |
|---|---|---|
| 0201715 | 11/1986 | European Pat. Off. |
| 63-015816 | 1/1988 | Japan . |
| 79-015596 | 2/1979 | Japan . |

*Primary Examiner*—Veronica P. Hoke
*Attorney, Agent, or Firm*—Paul R. Steyermark

[57] ABSTRACT

A crystalline polyester film or sheet coated with a primer composition consisting essentially of a carboxylated polyurethane, wherein the carboxyl groups are introduced by esterifying the terminal hydroxyl groups and amidizing any terminal amine groups of the polyurethane with a dicarboxylic acid anhydride. Such primer compositions form continuous wet films and dry coatings and provide surfaces receptive to a variety of surface finishes such as further polymer coatings and inks.

6 Claims, No Drawings

ADHERABLE POLYESTER FILM

BACKGROUND OF THE INVENTION

This invention relates to an adherable film or sheet of a crystalline polyester coated on at least one side thereof with a carboxylated polyurethane primer composition having good adherability both to the base polyester and to other coating compositions such as, for example, solutions or dispersions of inks or pigments, polymer latices, dispersions of magnetic or photographic materials, and evaporatively deposited metal.

These polyurethane primer compositions may also be used to impart heat sealability of the product to itself and other materials. Further, this invention relates to film-forming polymer emulsions, some uses of which are above described.

Polyester films or sheets, especially those of polyethylene terephthalate (PET), are widely used in such applications as packaging, decorative articles, magnetic recording media, and photographic film. In such applications, the polyester film is printed or coated with a variety of materials, which must be applied as a uniform and continuous layer and must well adhere to the base polymer. However, PET and similar polymers do not have good receptivity to most surface-treating compositions. This problem has long been recognized in the prior art, and various methods have been developed to increase the polyester film's surface receptivity. A good discussion of the prior art in this area can be found in U.S. Pat. No. 4,467,189 (Posey et al., American Hoechst Corp.) granted Oct. 9, 1984. Nevertheless, most primers used commercially are oriented to specific end uses and are suitable only for either hydrophobic or hydrophilic surface treatment.

U.S. Pat. No. 4,476,189 discloses a primed water-dispersible copolyester of terephthalic acid, an aliphatic dicarboxylic acid, and an aromatic sulfonated monomer with an alkylene glycol. The resultant primed polyester film is said to provide excellent adhesion to many subsequently applied aqueous or solvent-based coatings.

Adhesion of the resultant primed polyester film can be humidity- or moisture-sensitive.

The presence of the aromatic sulfonated monomer, which can be sodium sulfoterephthalic acid or a similar sulfonated derivative of a phthalic acid, is a shortcoming because such starting materials are not widely commercially available and therefore are expensive. It is thus desirable to provide a primed polyester film or sheet which could be manufactured from inexpensive, readily available materials.

BRIEF SUMMARY OF THE INVENTION

According to this invention, there is provided a crystalline polyester film or sheet coated with a carboxyl group-containing polyurethane primer composition consisting essentially of:

a polymer of at least one diol, the total amount of the diol component being 50 mole %, and 50 mole % of at least one diisocyanate, the polymer being modified by esterifying the terminal hydroxyl groups and amidizing any terminal amine groups of the polymer by treatment with the anhydride of a dicarboxylic acid, thus providing carboxyl groups;

said polyurethane composition further being optionally crosslinked by means of a melamine-formaldehyde, urea-formaldehyde, benzoguanamine-formaldehyde, glycoluril-formaldehyde, epoxy, or aziridine resins.

There is also provided an aqueous emulsion of said polyurethane primer composition.

DETAILED DESCRIPTION OF THE INVENTION

The preferred crystalline polyester film or sheet is PET, which is commercially available from several sources. Other linear, crystalline polyester films, including for example ethylene glycol polyesters of isophthalic acid or of mixtures of terephthalic and isophthalic acids, or polyesters of other glycols, especially of butanediol or mixtures of ethylene glycol with butanediol, can also serve as the base polyester film or sheet. For the purpose of this invention, the term "film or sheet" also includes tapes, disks, and similar commercial articles.

Typical representative diols used in preparing the polyurethane in primer compositions include ethylene glycol, propylene glycol, 1,4-butanediol, diethylene glycol, polyethylene glycol, polypropylene glycol, bis-2-hydroxyethyl adipate, bis-2-hydroxyethyl sebacate, bis-4-hydroxybutyl adipate, bis-4-hydroxybutyl sebacate, hydroxyl-terminated polybutylene adipate, hydroxyl-terminated polyethylene adipate, and hydroxyl terminated polypropylene sebacate.

Typical representative diisocyanates used in preparing the polyurethane primer compositions include toluene diisocyanate, diphenylmethane diisocyanate and hexamethylene diisocyanate.

Preferred polyurethane starting materials are Estane ® polyurethane polymers sold by B. F. Goodrich, Cleveland, Ohio. Particularly preferred compositions are:

Estane ® 5701, from poly(tetramethylene adipate) glycol and diphenylmethane diisocyanate;

Estane ® 5706, from 1,4-cyclohexanedimethanol and diphenylmethane diisocyanate;

Estane ® 5708, from adipic diol and diphenylmethane diisocyanate;

Estane ® 5740 X716, from polycarbonate polyol and diphenylmethane diisocyanate; and Estane ® 5788, from polycarbonate polyol and diphenylmethane diisocyanate.

These polyurethanes have weight average molecular weights of about 8000 to 15,000 and number average molecular weights of about 70,000 to 100,000. Other polyurethanes can be used in place of the Estane ® polyurethane resins.

The anhydride used to modify the starting polyurethane can be derived from virtually any dicarboxylic acid, including aliphatic, aromatic, cycloaliphatic, saturated, and unsaturated acids. Typical representative anhydrides include for example, adipic, succinic, glutaric, sebacic, maleic, and phthalic anhydrides.

The preferred anhydrides used to esterify the terminal hydroxyl groups of the polyurethane to provide carboxyl groups are glutaric, phthalic and succinic anhydrides. One way this esterification can be carried out is by heating the hydroxyl-terminated polyurethane with the anhydride in the absence of a solvent at a temperature of about 200° C. Another way the esterification can be carried out is by contacting the hydroxyl-terminated resin with the anhydride in a solvent using a tertiary amine as a catalyst. The anhydride normally is used in excess of the stoichiometric amount, and the excess is removed by hydrolysis.

The melamine-formaldehyde, urea-formaldehyde, benzoguanamine-formaldehyde, glycoluril-formaldehyde, epoxy, and aziridine resins used as crosslinking agents are articles of commerce. They can be obtained, for example, from American Cyanamid Co. under the trademarks Cymel® and Beetle®, from Virginia Chemicals under the trademark Xama®, and from Shell Chemical Co under the trademark Epon®. The resin is used in an amount of 0 to 40%, based on the weight of the carboxylated polyurethane, and is preferably added to the coating composition, which is in the form of an aqueous emulsion. The aqueous emulsion is prepared by dissolving the carboxylated polyurethane in tetrahydrofuran, neutralizing the carboxylic groups with an inorganic base, ammonia, or an organic amine, and adding water with good agitation to cause emulsification, then evaporating tetrahydrofuran, preferably at a reduced pressure.

While one of the solvents used for emulsification must be tetrahydrofuran, other water-soluble solvents such as, for example, dioxane, acetone, dimethoxyethane, methyl ethyl ketone, and methanol can be present in varying concentrations without adversely affecting emulsion quality. The amount of cosolvent depends on the cosolvent used and can range from 25 to 75% by weight of the total tetrahydrofuran-cosolvent mixture. A 75 to 25% by weight mixture of methyl ethyl ketone and tetrahydrofuran provides an especially preferred emulsification solvent mixture for use in this invention.

Suitable bases for neutralizing the carboxylic acid end groups should form water-soluble salts with carboxylic acids. Preferred are tertiary aliphatic amines which are liquid at room temperature, such as triethylamine, tripropylamine, tributylamine, etc. Tertiary amines are preferred because of their better hydrolytic stability relative to ammonia and to primary and secondary amines, coupled with their ready volatility so that they do not impede the crosslinking reactions. Of course, it is preferred to use the lowest practical molecular weight amine because of its lower cost per mole and better water solubility.

In the practical operation of this invention, a polyester film, such as PET or another linear polyester, either unstretched or uniaxially or biaxially stretched, is coated with an aqueous emulsion of the carboxylic acid-terminated polyurethane by any conventional technique, such as, for example, passing the polyester film through a bath of the coating emulsion or by applying the emulsion to one side only with a roller or a brush. The coated material is then dried, the coated film stretched, if desired, and heated to a sufficient temperature to cause crosslinking of the polymeric coating with the crosslinking agent. If the coating is applied to an unstretched film, or unidirectionally stretched film, the film can be stretched following the coating step without loss of the mechanical integrity of the coating and then heated to a sufficient temperature to cause crosslinking. For best results, the thickness of the primer coating after drying and stretching should be about 0.01 to 0.10 μm, preferably 0.03 to 0.06 μm. The usual amount of coating material is about 0.03 to 0.06 g/m² of polyester film surface.

For best results, the thickness of the heat sealable coating is 0.05 to 15 m, preferably 1-3 μm. The usual amount of coating material is about 1 to 3 g/m² of polyester film surface.

It has been surprisingly found that the starting polyurethanes, even though they can be well emulsified and form continuous wet films with wetting aids, do not themselves form continuous dry coatings. Thus, formation of free carboxylic acid end groups is a necessary step in this invention. The quality of the primer coating is to some extent related to the acid number of the carboxylated polyurethane (thus, its molecular weight). It has been found that copolymers with an acid number as low as 3 can be emulsified satisfactorily according to the present invention and give good continuous dry coating on the polyester substrate. However, generally a carboxylated polyurethane with a higher acid number will be preferred, e.g., 4-12. Too high an acid number, for example, above 20, is undesirable because such a polymer has a low molecular weight, which leads either to a highly crosslinked coating or to one having low integrity.

The amount of crosslinking resin used in the compositions of this invention, while normally sufficient to crosslink all the free carboxyl groups of the polymer, can be adjusted to crosslink only some of the carboxyl groups, leaving a portion of the carboxyl groups uncrosslinked. Such partially crosslinked polymer would have greater receptivity for certain hydrophilic coatings, such as, e.g., photographic emulsions.

Wetting aids or surfactants are frequently required for practical use of this invention. They are added to the formed emulsion, rather than to the mixture being emulsified. While polymeric emulsions made as described above are film-forming, these emulsions often do not wet polyester films due to the emulsions' higher surface tension. As is well known, addition of surfactants to the liquid phase to lower its surface tension to less than that of the substrate permits formation of a continuous wet film.

Most commercial surfactants which result in a surface tension (energy) of less than that of polyester film may be used.

Particularly preferred surfactants are sodium lauryl sulfate, sodium salt of dioctyl sulfosuccinate, nonylphenol polyethylene glycol ethers, and ammonium lauryl ether sulfates.

This invention is now illustrated by representative examples where all percentages of monomers are given as mole percent; other parts, proportions, and percentages are by weight, unless otherwise indicated.

The polyester film used in all the examples was PET film sold by E. I. du Pont de Nemours and Company under the trade name Mylar®. The polyurethanes were commercial products available from Goodrich Chemical Co. as Estanes®. The melamine-formaldehyde resin was Cymel®, available from Americal Cyanamid Company. Ammonia and triethylamine are commercial products available from several sources. Glutaric anhydride was obtained from Aldrich Chemical Company and succinic anhydride was obtained from Baker Chemical Company.

The thickness of primer coating was determined by on-line coating weight determinations. The continuity of primer coating was determined by microscopic examination.

COPOLYMERS

Polyurethane 1

Estane® polyurethane 5701, 300 g, was charged into a 3-necked round bottom flask fitted with an overhead stirrer, nitrogen bleed, reflux condenser, thermometer, and addition port. The flask was heated in refluxing ethylene glycol vapor (198° C.).

When the stirred (50 rpm) polyurethane reached the heating medium temperature, 0.6 ml of ethylene glycol was added, and the mixture was allowed to equilibrate for two hours at 198° C.; then, 3.66 g of succinic anhydride was added. After ten minutes, the flask was discharged.

Inherent viscosity (in methylene chloride): 0.31
  Acid number: 7.3
Molecular weight
  number average: 4,700
  weight average: 31,000
See Emulsion 1

Polyurethanes 2-5

Using the procedure described for Polyurethane 1, 200 g of the following Estane ® polyurethanes were first allowed to react with 1 ml of ethylene glycol and then with 2.44 g of glutaric anhydride

| Copolymer | Polyurethane | Inherent Viscosity (THF) | Acid Number | See Emulsion |
|---|---|---|---|---|
| 2 | Estane ® 5706 | 0.28 | 6.9 | 2 |
| 3 | Estane ® 5708 | 0.32 | 6.7 | 3 |
| 4 | Estane ® 5740 × 716 | 0.32 | 6.3 | 4 |
| 5 | Estane ® 5788 | 0.40 | 6.2 | 5 |

Copolymer 6 (Comparative)

Using the procedure employed in the first step of the preparation of Polyurethane 4, 200 ml of Estane ® 5740 X 716 was allowed to react with 1 ml of ethylene glycol.

Inherent viscosity (in THF): 0.40
Acid number: 0.7
See Emulsion 6

EMULSIONS

Emulsion 1

Copolymer 1 (100 g) was dissolved in 400 g of THF. After 10 ml of triethylamine had been added, 600 g of water was added with rapid stirring. The THF was evaporated, leaving a stable, white emulsion of 12.4% solids. See Coatings 1, 2, 3.

Emulsions 2-5

Emulsions 2 to 5 were prepared by dissolving 10 g of the indicated copolymer in 40 g of THF. One ml of triethylamine and 80 g of water were added with rapid stirring. The THF was evaporated from the resultant emulsions.

| Emulsion | Copolymer | % Solids | Appearance | See Coating |
|---|---|---|---|---|
| 2 | 2 | 8.2 | bluish white | 4 |
| 3 | 3 | 8.9 | whitish blue | 5 |
| 4 | 4 | 8.2 | whitish blue | 6 |
| 5 | 5 | 10.7 | whitish blue | 7 |

Emulsion 6 (comparative)

Copolymer 6 (5 g) was dissolved in 20 g THF. After 1 ml of triethylamine had been added, 40 g of water was added with rapid stirring. The polyurethane precipitated and emulsification was unsuccessful.

COATINGS

Coating 1

A coating bath consisting of the following was prepared:
80.8 g Emulsion 1
0.2 ml triethylamine
0.36 g E535 ®
0.1 g Aerosol ® OT-75
1.86 g isopropyl alcohol
2.5 g 30% Duponol ® WAQE surfactant water to make 200 g.

Coating 2

Same as Coating 1, plus:
0.1 g Cymel ® 301
0.005 g ammonium sulfate.

Coating 3

Same as Coating 1, plus:
0.5 g Cymel ® 301
0.025 g ammonium sulfate.

Coatings 1–3 were applied by multiple kiss coating at the rate of 0.12 g/m² (after drying) per pass, until the desired coating weights were obtained. After each pass, the coating was cured at 160° C. for 2 seconds. Samples with the desired final coat weight were also cured under restraint at 200° C. for 1 minute.

Each coating was continuous.

Coatings 4∫7

The following coatings were prepared:

| Coating | Emulsion | Duponol ® WAQE (30% active) | Water |
|---|---|---|---|
| 4 | 2 (48.8 g) | 0.67 g | To make 80 g bath |
| 5 | 3 (44.9 g) | 0.67 g | To make 80 g bath |
| 6 | 4 (48.8 g) | 0.67 g | To make 80 g bath |
| 7 | 5 (37.4 g) | 0.67 g | To make 80 g bath |

Coatings 4–7 were kiss coated on polyester film using an off-line coating tower. The dried coating weight for each sample was 0.12 g/m² and each coating was continuous.

HEAT SEAL

Using a Robot Heat Sealer (Pack Rite Machine, Franksville, WI) with nip pressure of 138 kPa, jaw temperature of 100° C., and dwell time of 5 sec., each of Coatings 1-3 in the Table below was heat-sealed to itself, coated side to coated side. The heat-sealed samples were aged for 2 days. The peel strengths, determined as 90° peels on 2.54 cm wide samples at a peel rate of 30.5 cm/min, are reported in the Table.

TABLE

| | Peel Strengths (g/cm × 2.54) | | | | | | | | | |
|---|---|---|---|---|---|---|---|---|---|---|
| | 160° C. Cure | | | | | 200° C. Cure | | | | |
| Coating Weights (g/m²): | 0.12 | 0.24 | 0.48 | 0.96 | 1.92 | 0.12 | 0.24 | 0.48 | 0.96 | 1.92 |
| Coating 1 | 0 | 0 | 27 | 63 | 10.5 | 0 | 0 | 0 | 3 | 10 |

TABLE-continued

| Coating Weights (g/m²): | Peel Strengths (g/cm × 2.54) | | | | | | | | | |
| --- | --- | --- | --- | --- | --- | --- | --- | --- | --- | --- |
| | 160° C. Cure | | | | | 200° C. Cure | | | | |
| | 0.12 | 0.24 | 0.48 | 0.96 | 1.92 | 0.12 | 0.24 | 0.48 | 0.96 | 1.92 |
| 2 | 0 | 0 | 22 | 78 | 132 | 0 | 0 | 27 | 110 | 107 |
| 3 | 0 | 3 | 30 | 60 | 257 | 0 | 8 | 48 | 185 | 280 |

As can be seen from the Table, these coatings can convey heat-sealing properties especially at coating weights of about 1 g/m² and higher. The heat-sealability of the coatings can be controlled by both the concentration of crosslinking agent and the curing temperature.

Explanation of Examples

Coatings a. Coatings 1–3 are examples of compositions that can impart various levels of heat sealability to polyester film, as shown in the Table.

b. Coatings 4–7 are examples of film-forming carboxyl group-containing polyurethane compositions of this invention which give continuous dry coatings.

Emulsions

Emulsions 1–5, when compared to Emulsion 6, show that the polyurethanes must be terminated by a carboxyl group.

I claim:

1. A process for preparing an aqueous, film-forming coating emulsion of a carboxyl group-containing polyurethane composition consisting essentially of a polymer of at least one diol, the total amount of the diol component being 50 mole %, and 50 mole % of at least one diisocyanate, the polymer being modified by esterifying the terminal hydroxyl groups and amidizing any terminal amine groups of the polymer by treatment with the anhydride of a dicarboxylic acid, thus providing carboxyl groups, the acid number of the carboxyl group-containing polyurethane being about 3–20;

said process comprising the following sequential steps:

(a) dissolving the carboxyl group-containing polyurethane in an organic solvent selected from the group consisting of tetrahydrofuran and mixtures of tetrahydrofuran with at least one other organic cosolvent selected from the group consisting of methanol, acetone, dioxane, dimethoxyethane, and methyl ethyl ketone, the amount of cosolvent other than methyl ethyl ketone or total amount of such cosolvents being at most about 25 weight % of the solvent mixture, and the amount of methyl ethyl ketone being at most about 75 weight % of the solvent mixture, the balance in each case being tetrahydrofuran;

(b) neutralizing the carboxylic groups with an inorganic base, ammonia, or an organic amine;

(c) adding a sufficient amount of water with good agitation to cause emulsification; and (d) evaporating the organic solvent.

2. The process of claim 1 wherein a surfactant is added to the emulsion following the evaporation of organic solvent.

3. The process of claim 2 wherein the surfactant is selected from the group consisting of sodium lauryl sulfate, sodium salt of dioctyl sulfosuccinate, nonylphenol polyethylene glycol ethers, and ammonium lauryl ether sulfates.

4. The process of claim 1 wherein the carboxyl group-containing polyurethane has an acid number of 4–12.

5. The process of claim 1 wherein the organic solvent is a mixture of about 75 weight percent of methyl ethyl ketone and 25 weight percent of tetrahydrofuran.

6. The process of claim 4 wherein the neutralization step is carried out with an organic tertiary amine.

* * * * *